Nov. 4, 1924.  
H. BARNARD ET AL  
1,513,954

HAND BRAKE FOR RAILWAY CARS

Filed April 21, 1923

Inventors.  
Harry Barnard  
Stanley F. Beasley  
By Gilbert Mann  
Attys.

Patented Nov. 4, 1924.

1,513,954

UNITED STATES PATENT OFFICE.

HARRY BARNARD, OF CHICAGO, ILLINOIS, AND STARLEY F. BEASLEY, OF KANSAS CITY, KANSAS, ASSIGNORS TO UNIVERSAL DRAFT GEAR ATTACHMENT COMPANY, OF CHICAGO, ILLINOIS, A CORPORATION OF ILLINOIS.

HAND BRAKE FOR RAILWAY CARS.

Application filed April 21, 1923. Serial No. 633,699.

*To all whom it may concern:*

Be it known that we, HARRY BARNARD and STARLEY F. BEASLEY, citizens of the United States, and residents, respectively, of Chicago, county of Cook, State of Illinois, and Kansas City, county of Wyandotte, and State of Kansas, have invented certain new and useful Improvements in Hand Brakes for Railway Cars, of which the following is a specification, and which are illustrated in the accompanying drawings, forming a part thereof.

This invention relates to hand brakes for railway cars and has for its principal object to permit the slack to be taken up quickly and the braking pressure to be applied with sufficient mechanical advantage to compare favorably with brake applications made by air pressure.

It is a comparatively simple matter to so design a hand brake mechanism that it will take up slack quickly, or to so design it that it will apply the brakes with the desired pressure, but getting the speed necessary to a quick take-up and then the power required for proper brake application in a device sufficiently cheap and hardy to be commercially practical has proven to be a difficult problem. We have invented a mechanism including a lever that first operates at mechanical disadvantage with high speed to take up the slack and then operates with mechanical advantage at less speed to apply the braking pressure; and the parts necessary to convert the conventional hand brake mechanism to the invention are so simple and cheap that cars can be equipped according to the invention at a normal cost.

What we now regard as the preferred form of the invention is shown in the accompanying drawings in which—

Figure 1:
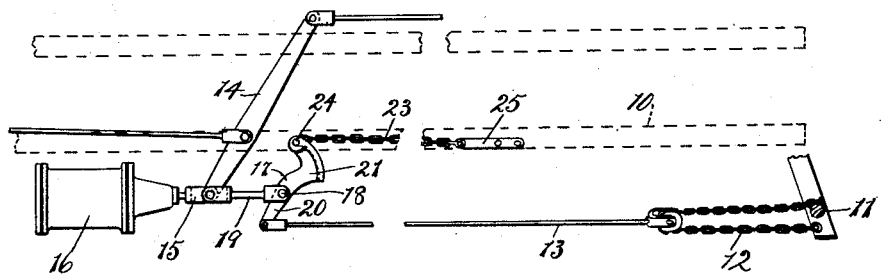
Fig. 1 is a fragmentary plan view illustrating a hand brake mechanism embodying the invention.
Figure 2:
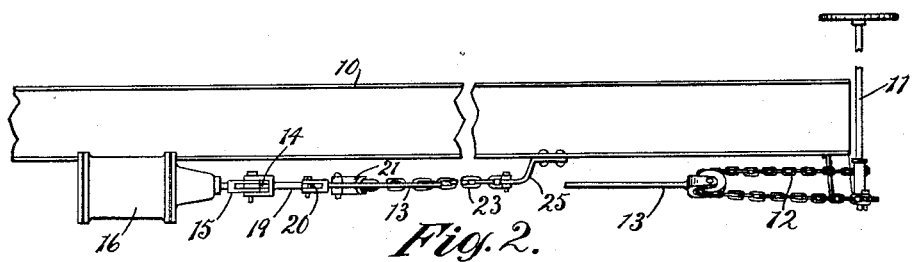
Fig. 2 is a side elevation of the mechanism shown in Fig. 1.

Referring to Figs. 1 and 2 the reference numeral 10 indicates a portion of a car underframe and 11 is a brake staff suitably mounted adjacent to the end of the frame and equipped with the chain or cable 12, by which the hand brake rod 13 is operated in the usual manner. Ordinarily the rod 13 is connected directly to the brake lever 14 which is also connected to the push rod 15 that is operated by the piston in the air cylinder 16.

Figure 3:
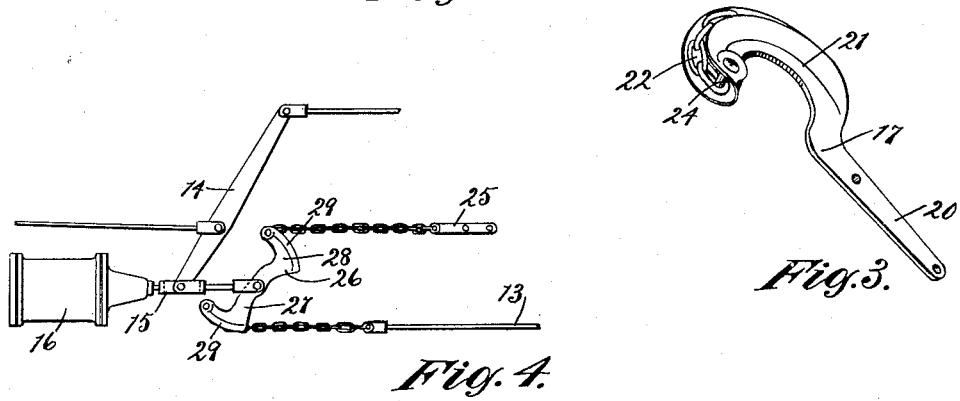
Fig. 3 is a perspective view of the rotating lever by which the speed of taking up slack is first increased and then the power for applying the braking pressure is multiplied.

According to the present invention a rotating lever 17, shown in perspective in Fig. 3, is interposed between the hand brake rod, or other connection operated by the brake staff, and the brake lever 14. As shown, the lever 17 is fulcrumed at 18 on a short connecting rod 19 which is fastened to the brake lever 14. The lever 17 has two arms 20 and 21, the former in Figs. 1 and 2, being substantially straight and connected to the brake rod 13. The arm 21 is here shown provided with a curved and grooved working face 22 to the extreme end of which a chain or cable 23 is connected, as indicated at 24. The opposite end of the chain or cable is secured to an anchorage here represented by the strap 25 which, in turn, is made fast to the car underframe in any suitable way.

The working surface 22 may be of any particular form so long as it tends to shorten the effective length of the arm 21 when the lever 17 is rotated in a counter clock-wise direction, as in Fig. 1.

As a result of this construction and arrangement it can be readily seen that upon operating the brake staff 11 the lever 17 will first rotate in a counter clock-wise direction with the arm 21 of sufficient length with respect to the arm 20 to make the fulcrum of the lever 17 travel to the right rapidly and thereby take up the slack in the mechanism quickly. The curvature or other changing of form of the working surface 22, however, causes the effective length of the arm 21 to decrease with this counter clock-wise rotation and when the slack is taken up the relation between the arms 20 and 21 is such as to give the lever 17 the necessary mechanical advantage for applying the brakes with the desired pressure.

It is not necessary that the arm 21 be constructed as shown or be connected with a chain or a cable. It is sufficient if the arrangement permits the lever to first multiply the speed of the hand brake rod 13 in taking up the slack and then automatically shift the fulcrum or change the leverage to enable the lever 17 to multiply the power of the hand brake rod 13 sufficiently to give the desired pressure on the brake shoes.

Figure 4:
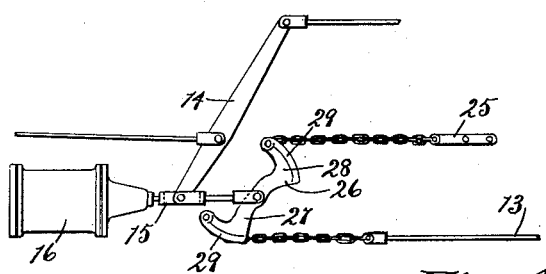
Fig. 4 is a plan view showing an alternative form of such lever.
Figure 5:
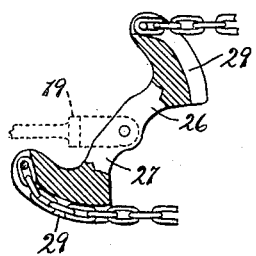
Fig. 5 is an enlarged sectional view illustrating the details of that lever.

Figs. 4 and 5 illustrate a form of rotating lever in which the slack is taken up more quickly and the power of the brake rod is multiplied higher than in the form shown in Figs. 1, 2 and 3. In this modification the lever 26 corresponding to the lever 17 has two arms 27 and 28 both of which are equipped with working surfaces 29, corresponding to the surface of the lever 17, and they are respectively connected by suitable means with the brake rod 13 and the anchorage 25. With this construction the lever arm 28 decreases in effective length with the operative rotation and the lever arm 29 increases with such rotation. When the brakes are slack the arm 27 is comparatively short and the arm 28 comparatively long, and by the time the slack is taken up conditions are reversed and the lever 28 is relatively short and the lever 29 is relatively long.

These illustrations will enable those skilled in the art to make use of the invention and to variously embody it in useful forms suited to particular conditions, all without departing from the spirit of the invention.

We claim as our invention:

1. In a brake mechanism for railway cars, the combination of a brake staff, a brake lever, a rotating lever pivoted at its central portion and provided with two arms, a connection between the fulcrum of the rotating lever and the brake lever, a connection between one arm of the rotating lever and the brake staff, and a connection between the other arm of the rotating lever and an anchorage, one arm of said rotating lever having a curved working surface cooperating with the corresponding connection to vary the effective length of that arm as the lever rotates.

2. In a brake mechanism for railway cars, the combination of a brake staff, a brake lever, a rotating lever having two arms, means for pivotally mounting the rotating lever at the fulcrum and connecting the fulcrum with the brake lever, means for permanently connecting one of said arms with the brake staff, the other arm of the lever being provided with a curved working face and a chain connected with the lever and an anchorage and cooperating with the curved working surface.

3. In a brake mechanism for railway cars, the combination of a brake staff, a brake lever, a rotating lever having two arms, means to rotatably mount the lever at its central portion and connect the same with the brake lever, means for giving one arm of the lever a rolling engagement with a fixed anchorage, and means for connecting the other arm of the lever with the brake staff.

4. In a brake mechanism for railway cars, the combination of a brake staff, a brake lever and an extensible and contractible connection between the brake staff and the brake lever including a rotatable lever having two separate and independent arms, a connection between one arm and the brake staff and a connection between the other arm and an anchorage, one connection and the corresponding arm being arranged to effect a shortening of that arm as the lever is rotated.

5. In a brake mechanism for railway cars, the combination of a brake staff, a brake lever, a rotating lever having two arms, a connection between a fulcrum of the rotating lever and the brake lever, a permanent connection between one of said arms of the rotating lever and the brake staff, a connection between the other arm of the rotating lever and an anchorage, the engagement between one of said connections and the corresponding lever arm being automatically adjustable to vary the effective length of that arm as the lever is rotated in applying the brakes.

6. In a brake mechanism for railway cars, the combination of a brake staff, a brake lever and an extensible and contractible connection between the brake staff and the brake lever, including a rotatable lever having two arms, a connection between one arm and the brake staff and a connection between the other arm and an anchorage, said arms being provided with converging working faces whereby on the rotation of said rotating lever a change of leverage in said arms is effected.

HARRY BARNARD.
STARLEY F. BEASLEY.